(12) United States Patent
Fowler (10) Patent No.: US 12,525,841 B2
(45) Date of Patent: Jan. 13, 2026

(54) COOLING AN ELECTRIC MACHINE OF A TURBINE ENGINE POWERPLANT

(71) Applicant: Raytheon Technologies Corporation, Farmington, CT (US)

(72) Inventor: Robert B. Fowler, West Palm Beach, FL (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/217,241

(22) Filed: Jun. 30, 2023

(65) Prior Publication Data

US 2025/0007351 A1    Jan. 2, 2025

(51) Int. Cl.

| | |
|---|---|
| *H02K 5/20* | (2006.01) |
| *F02C 6/00* | (2006.01) |
| *F02C 7/18* | (2006.01) |
| *F02C 7/32* | (2006.01) |
| *H02K 7/18* | (2006.01) |

(52) U.S. Cl.
CPC .............. *H02K 5/207* (2021.01); *F02C 6/00* (2013.01); *F02C 7/18* (2013.01); *F02C 7/32* (2013.01); *H02K 7/1823* (2013.01)

(58) Field of Classification Search
CPC ............................. H02K 7/116; H02K 7/1823
See application file for complete search history.

(56) References Cited

U.S. PATENT DOCUMENTS

| | | | |
|---|---|---|---|
| 5,449,961 A | 9/1995 | Ludwig | |
| 6,325,595 B1 * | 12/2001 | Breeze-Stringfellow | ............. F01D 17/10 415/144 |
| 6,585,482 B1 * | 7/2003 | Liotta | ............. F02C 7/18 415/144 |
| 7,231,767 B2 | 6/2007 | Whiting | |
| 8,356,486 B2 | 1/2013 | Walters | |
| 11,067,003 B2 | 7/2021 | Stevenson | |
| 11,584,539 B2 | 2/2023 | Ullyott | |
| 11,614,032 B2 | 3/2023 | Boufford | |
| 2014/0130510 A1 | 5/2014 | Bouldin | |
| 2019/0101057 A1 * | 4/2019 | Stevenson | ............. H02K 9/16 |
| 2020/0182158 A1 * | 6/2020 | Kupratis | ............. F01D 21/003 |

(Continued)

FOREIGN PATENT DOCUMENTS

EP    4083391 A1    11/2022

OTHER PUBLICATIONS

EP Search Report for EP Patent Application No. 24185766.3 dated Nov. 18, 2024.

*Primary Examiner* — Sean Gugger
(74) *Attorney, Agent, or Firm* — Getz Balich LLC (57) ABSTRACT

A powerplant is provided that includes an electric machine, a turbine engine and a fluid circuit. The turbine engine is operatively coupled to the electric machine. The turbine engine includes a flowpath, a compressor section, a combustor section and a turbine section. The flowpath extends through the compressor section, the combustor section and the turbine section from an inlet into the flowpath to an exhaust from the flowpath. The compressor section includes a shroud forming a peripheral boundary of the flowpath. The fluid circuit includes a passage, a port and a conduit. The passage is within the electric machine. The port extends through the shroud to the flowpath. The conduit fluidly couples the passage to the port.

18 Claims, 6 Drawing Sheets

(56) References Cited

U.S. PATENT DOCUMENTS

| | | | | |
|---|---|---|---|---|
| 2020/0224547 A1* | 7/2020 | Chong | ................... | H02K 21/14 |
| 2021/0006132 A1* | 1/2021 | Steinz | ................. | F16H 57/0417 |
| 2022/0325632 A1* | 10/2022 | Yazaki | .................... | F01D 11/02 |

* cited by examiner

COOLING AN ELECTRIC MACHINE OF A TURBINE ENGINE POWERPLANT

BACKGROUND OF THE DISCLOSURE

1. Technical Field

This disclosure relates generally to a powerplant and, more particularly, to cooling an electric machine of the powerplant.

2. Background Information

A powerplant such as an auxiliary power unit (APU) for an aircraft typically includes an electric motor mechanically driven by an auxiliary power unit engine. The electric motor may generate heat during operation which needs to be dissipated. Various systems and methods are known in the art for cooling an electric motor. While these known cooling systems and methods have various benefits, there is still room in the art for improvement.

SUMMARY OF THE DISCLOSURE

According to an aspect of the present disclosure, a powerplant is provided that includes an electric machine, a turbine engine and a fluid circuit. The turbine engine is operatively coupled to the electric machine. The turbine engine includes a flowpath, a compressor section, a combustor section and a turbine section. The flowpath extends through the compressor section, the combustor section and the turbine section from an inlet into the flowpath to an exhaust from the flowpath. The compressor section includes a shroud forming a peripheral boundary of the flowpath. The fluid circuit includes a passage, a port and a conduit. The passage is within the electric machine. The port extends through the shroud to the flowpath. The conduit fluidly couples the passage to the port.

According to another aspect of the present disclosure, another powerplant is provided that includes an electric machine and a turbine engine. The electric machine includes an internal passage. The turbine engine is operatively coupled to the electric machine. The turbine engine includes a flowpath, a compressor section, a combustor section and a turbine section. The flowpath extends through the compressor section, the combustor section and the turbine section from an inlet into the flowpath to an exhaust from the flowpath. The turbine engine is configured to draw air through the internal passage and into the core flowpath during operation.

According to still another aspect of the present disclosure, a method of operation is provided. This method includes: driving rotation of a rotor within an electric machine using a turbine engine to generate electricity; and drawing air through an internal passage of the electric machine into a flowpath of the turbine engine to cool the electric machine.

The internal passage may be fluidly coupled to the flowpath through a port in a shroud housing a compressor rotor of the turbine engine.

The turbine engine may include a compressor section, a combustor section and a turbine section. The flowpath may extend through the compressor section, the combustor section and the turbine section from an inlet into the flowpath to an exhaust from the flowpath.

The electric machine may include an electric machine stator. The passage may extend through and/or along the electric machine stator.

The electric machine may include an electric machine rotor. The passage may extend through and/or along the electric machine rotor.

The compressor section may also include a compressor rotor housed within the shroud. The compressor rotor may include a plurality of compressor blades arranged circumferentially about an axis and disposed within the flowpath.

The port may be located longitudinally along the flowpath at the compressor rotor.

The compressor blades may include a first compressor blade. The port may be located longitudinally along the flowpath downstream of a leading edge of the first compressor blade.

The compressor blades may include a first compressor blade. The port may be located longitudinally along the flowpath upstream of a trailing edge of the first compressor blade.

The compressor blades may include a first compressor blade. The port may be located longitudinally along the flowpath between a leading edge of the first compressor blade and a trailing edge of the first compressor blade.

The compressor rotor may be configured as a radial flow compressor rotor.

The port may be a first port, and the fluid circuit may also include a second port and a manifold. The second port may extend through the shroud to the flowpath. The manifold may fluidly couple the first port and the second port to the conduit.

The compressor section may be configured to draw air through the fluid circuit and into the flowpath during regular operation of the turbine engine.

The compressor section may be configured to direct air out the flowpath and into the fluid circuit during startup operation of the turbine engine.

The electric machine may be configurable as an electric generator.

The electric machine may be configurable as an electric motor.

The powerplant may also include a drivetrain rotatably coupling a rotating assembly of the turbine engine to a rotor of the electric machine.

The drivetrain may include a geartrain coupled between the rotating assembly of the turbine engine and the rotor of the electric machine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
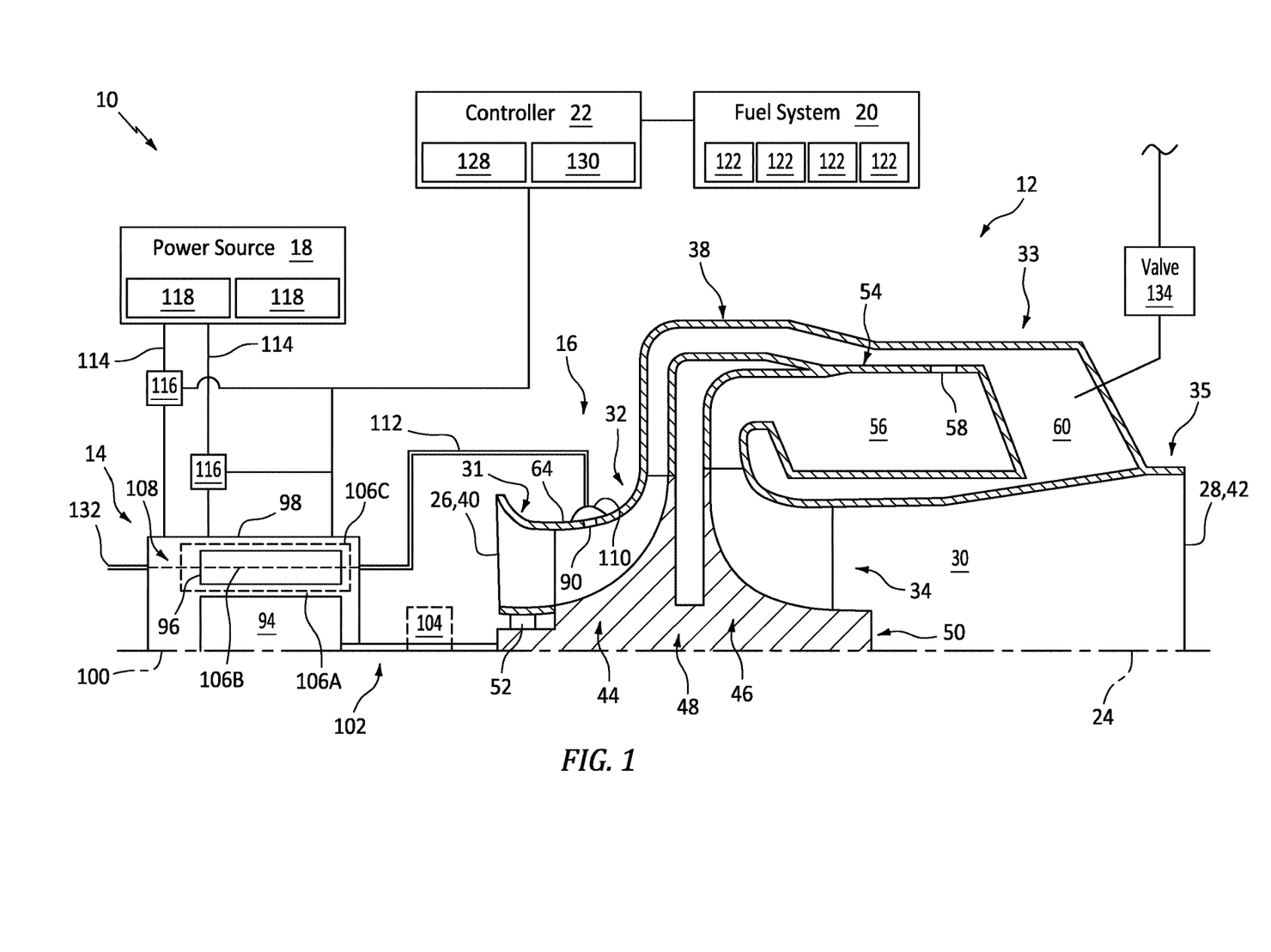
FIG. 1 is a partial schematic illustration of a powerplant for an aircraft.

FIG. 1 illustrates a powerplant 10 for an aircraft. The aircraft may be an airplane, a helicopter, a drone (e.g., an unmanned aerial vehicle (UAV)) or any other manned or unmanned aerial vehicle or system. For ease of description, the powerplant 10 may be generally described below as an auxiliary power unit (APU) for the aircraft. However, it is contemplated the powerplant 10 may also or alternatively be configured as part of a propulsion system for the aircraft. It is further contemplated the powerplant 10 may alternatively be configured for a non-aircraft application such as, for example, a ground-based power generation system or otherwise.

The powerplant 10 of FIG. 1 includes a gas turbine engine 12, an electric machine 14 and a fluid circuit 16; e.g., a cooling circuit for the electric machine 14. The powerplant 10 of FIG. 1 also includes a power source 18, a fuel system 20 and a controller 22 for controlling operation of the powerplant 10.

The turbine engine 12 of FIG. 1 extends axially along an axial centerline 24 from a forward, upstream airflow inlet 26 into the turbine engine 12 to an aft, downstream combustion products exhaust 28 from the turbine engine 12. This axial centerline 24 may be a centerline axis and/or a rotational axis of the turbine engine 12 and/or one or more components within the turbine engine 12.

The turbine engine 12 of FIG. 1 includes a core flowpath 30, an inlet section 31, a compressor section 32, a (e.g., reverse flow) combustor section 33, a turbine section 34 and an exhaust section 35. At least (or only) the compressor section 32, the combustor section 33 and the turbine section 34 may form a core of the turbine engine 12. The turbine engine 12 also includes a stationary structure 38 housing and/or forming one or more or all of the engine sections 31-35.

The core flowpath 30 extends within the turbine engine 12 and its engine core from an airflow inlet 40 to the core flowpath 30 to a combustion products exhaust 42 from the core flowpath 30. More particularly, the core flowpath 30 of FIG. 1 extends sequentially through the inlet section 31, the compressor section 32, the combustor section 33 and the turbine section 34 to the exhaust section 35. The core inlet 40 may form the engine inlet 26 into the turbine engine 12. The core exhaust 42 may form the engine exhaust 28 from the turbine engine 12.

The compressor section 32 includes a bladed compressor rotor 44. The turbine section 34 includes a bladed turbine rotor 46. The compressor rotor 44 may be configured as a radial flow compressor rotor (e.g., an axial inflow-radial outflow compressor rotor), and the compressor section 32 may be configured as a radial flow compressor section. The turbine rotor 46 may be configured as a radial flow turbine rotor (e.g., a radial inflow-axial outflow turbine rotor), and the turbine section 34 may be configured as a radial flow turbine section. The compressor rotor 44 is connected to the turbine rotor 46 through an engine shaft 48. At least (or only) the compressor rotor 44, the turbine rotor 46 and the engine shaft 48 may collectively form an engine rotating assembly 50 (e.g., a spool) of the turbine engine 12. This rotating assembly 50 and its engine shaft 48 are rotatably supported by the stationary structure 38 through one or more bearings 52 (one shown for ease of illustration); e.g., rolling element bearings, journal bearings, etc.

The combustor section 33 includes a combustor 54 (e.g., an annular combustor) with an internal combustion chamber 56 (e.g., an annular combustion chamber). The combustor 54 of FIG. 1 is configured as a reverse flow combustor. Inlet ports 58/flow tubes into the combustion chamber 56, for example, may be arranged at (e.g., on, adjacent or proximate) and/or towards an aft bulkhead wall of the combustor 54. An outlet from the combustor 54 may be arranged axially aft of an inlet to the turbine section 34. The combustor 54 may also be arranged radially outboard of and/or axially overlap at least a (e.g., aft) portion of the turbine section 34. With this arrangement, the core flowpath 30 of FIG. 1 reverses direction (e.g., from a forward-to-aft direction to an aft-to-forward direction) a first time as the core flowpath 30 extends from a diffuser plenum 60 surrounding the combustor 54 into the combustion chamber 56. The core flowpath 30 of FIG. 1 then reverses direction (e.g., from the aft-to-forward direction to the forward-to-aft direction) a second time as the core flowpath 30 extends from the combustion chamber 56 into the turbine section 34.

During regular operation of the turbine engine 12, air enters the turbine engine 12 through the inlet section 31 and its core inlet 40. The inlet section 31 directs the air from the core inlet 40 into the core flowpath 30 and the compressor section 32. The air entering the core flowpath 30 may be referred to as "core air". This core air is compressed by the compressor rotor 44. The compressed core air is directed through a diffuser and its diffuser plenum 60 into the combustion chamber 56. Fuel is injected and mixed with the compressed core air to provide a fuel-air mixture. This fuel-air mixture is ignited within the combustion chamber 56, and combustion products thereof flow through the turbine section 34 and cause the turbine rotor 46 to rotate. The rotation of the turbine rotor 46 drives rotation of the compressor rotor 44 and, thus, compression of the air received from the core inlet 40.

Figure 2:
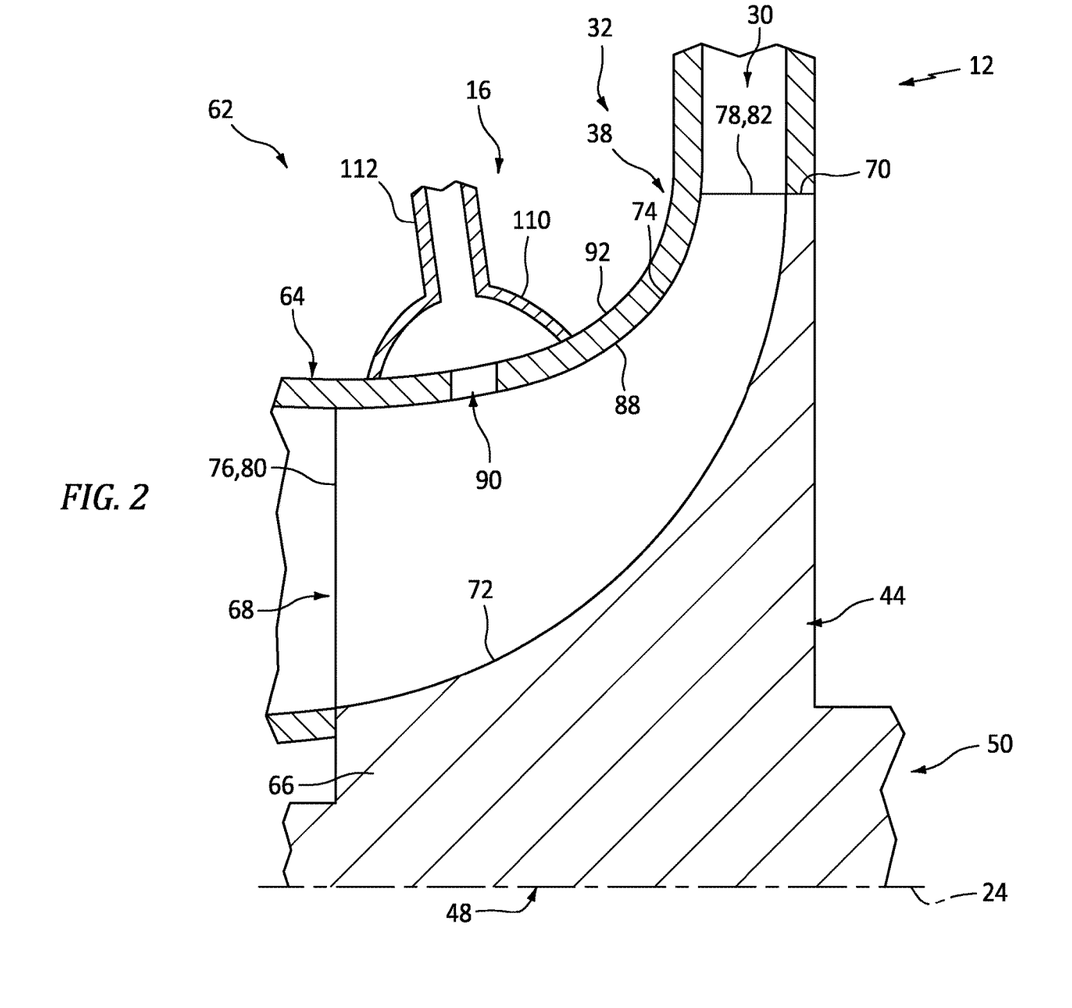
FIG. 2 is a partial sectional illustration of an assembly of the aircraft powerplant along a compressor section.

FIG. 2 illustrates an assembly 62 of the turbine engine 12 along the compressor section 32. This engine assembly 62 of FIG. 2 includes the compressor rotor 44 and a portion of the stationary structure 38 and, in particular, an outer shroud 64 (e.g., a tubular flowpath wall) included in the stationary structure 38 along the compressor section 32.

The compressor rotor 44 includes a rotor base 66 (e.g., a hub, a disk, etc.) and a plurality of compressor blades 68 (e.g., vanes, airfoil, etc.). The rotor base 66 of FIG. 2 projects axially along the axial centerline 24. The rotor base 66 projects radially (in a radial outward direction away from the axial centerline 24) to a radial outer side 70 of the compressor rotor 44 and its rotor base 66. The rotor base 66 forms a platform with an inner flowpath surface 72. This inner flowpath surface 72 may have a curved (e.g., arcuate, quarter circular, splined, etc.) sectional geometry when viewed, for example, in an axial reference plane parallel with (e.g., including) the axial centerline 24. With this arrangement, the rotor base 66 projects radially (in the radial outward direction) and axially to the inner flowpath surface 72.

Figure 3:
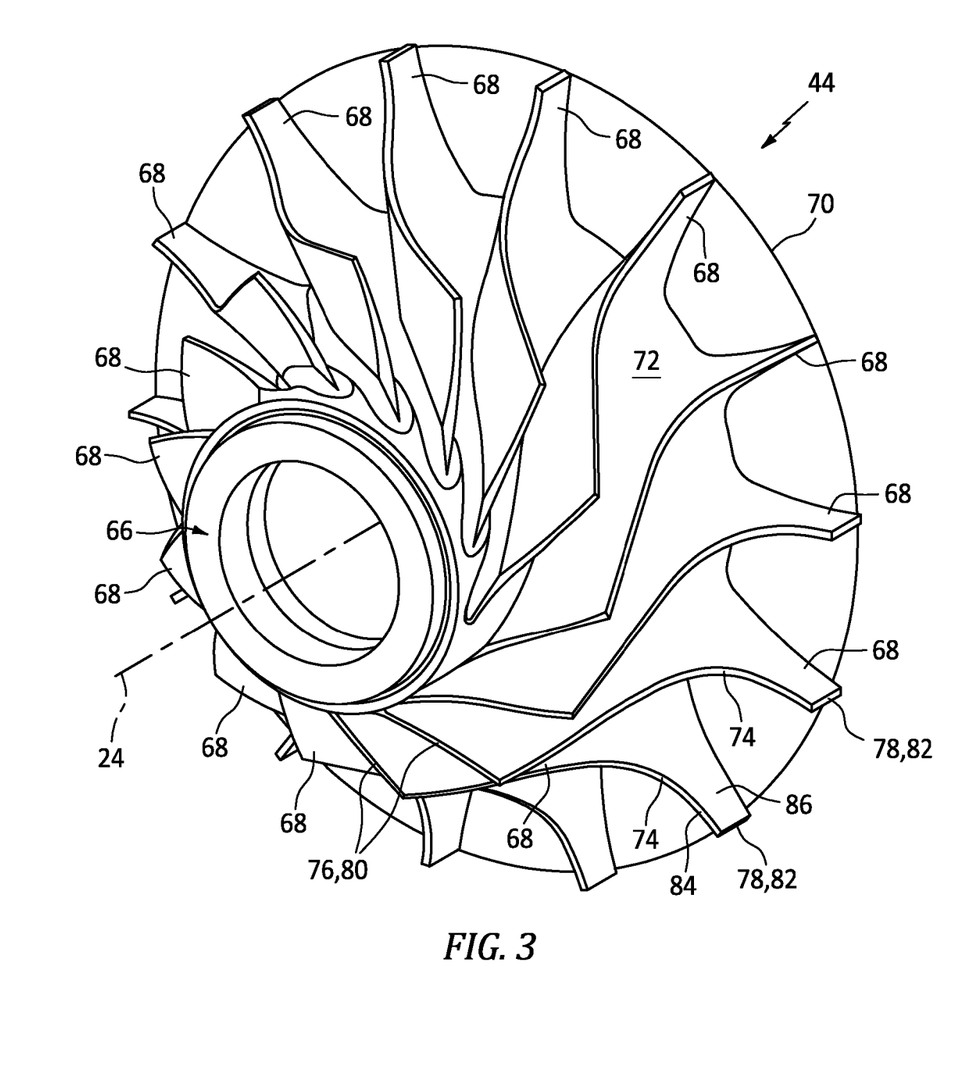
FIG. 3 is a perspective illustration of a compressor rotor.

Referring to FIG. 3, the compressor blades 68 are arranged circumferentially around the axial centerline 24 and the rotor base 66 in an annular array; e.g., a circular array. Each of the compressor blades 68 is connected (e.g., formed integral with or mechanically fastened, welded, brazed and/or otherwise attached to) the rotor base 66. Referring to FIG. 2, each compressor blade 68 projects axially out from the rotor base 66 and its inner flowpath surface 72 along the axial centerline 24 to a tip 74 of the respective compressor blade 68 and an axial end 76 of the respective compressor blade 68. Each compressor blade 68 projects radially out from the rotor base 66 and its inner flowpath surface 72 (in the radial outward direction) to its blade tip 74 and a radial end 78 of the respective compressor blade 68. The blade tip 74 projects radially inwards towards the axial centerline 24 from the blade radial end 78, and the blade tip 74 projects axially along the axial centerline 24 to the blade axial end 76. The blade axial end 76 forms a leading edge 80 of the respective compressor blade 68. The blade radial end 78 forms a trailing edge 82 of the respective compressor blade 68. Referring to FIG. 3, each compressor blade 68 has a pressure side 84 (e.g., a concave side) and a suction side 86 (e.g., a convex side).

Referring again to FIG. 2, the compressor rotor 44 is housed within the stationary structure 38 and its shroud 64. The shroud 64, for example, is disposed radially and/or axially adjacent the blade tips 74. This shroud 64 extends circumferentially around the compressor rotor 44, thereby circumscribing the compressor blades 68 and their blade tips 74. The shroud 64 forms an outer flowpath surface 88 opposite the inner flowpath surface 72. This outer flowpath surface 88 may have a curved (e.g., arcuate, quarter circular, splined, etc.) sectional geometry when viewed, for example, in the axial reference plane. With this arrangement, a portion of the core flowpath 30 within the compressor section 32 extends longitudinally across the compressor rotor 44, and is bounded (e.g., radially and/or axially) between the inner flowpath surface 72 and the outer flowpath surface 88. The shroud 64 thereby forms an outer flowpath wall along the core flowpath 30 within the compressor section 32.

Figure 4:
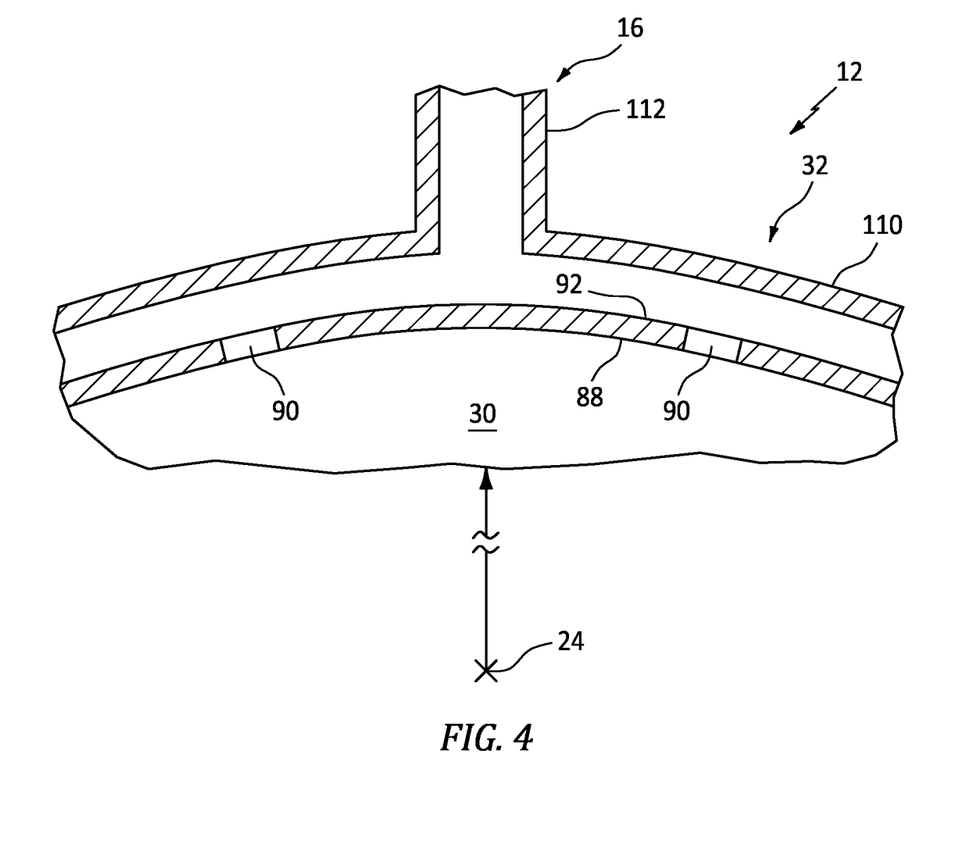
FIG. 4 is a partial cross-sectional illustration of a stationary structure in the compressor section.

Referring to FIG. 4, the shroud 64 includes one or more ports 90; e.g., through-holes, vents, etc. These ports 90 are arranged circumferentially about the axial centerline 24 in an array; e.g., an arcuate or circular array. Referring to FIG. 2, each port 90 extends (e.g., radially and/or axially) through a thickness of the shroud 64 (e.g., a sidewall of the shroud 64) from an exterior surface 92 of the shroud 64 to the outer flowpath surface 88. Each port 90 is thereby fluidly coupled with the core flowpath 30 within the compressor section 32. Each port 90 of FIG. 2 is arranged longitudinally along the core flowpath 30 at (e.g., on, adjacent or proximate) the compressor rotor 44. Each port 90 of FIG. 2, for example, is located longitudinally along the core flowpath 30 downstream of the blade leading edges 80. Each port 90 of FIG. 2 is further located longitudinally along the core flowpath 30 upstream of the blade trailing edges 82. Each port 90 of FIG. 2 may thereby be positioned longitudinally along the core flowpath 30 between the blade leading edges 80 and the blade trailing edges 82. The present disclosure, however, is not limited to such an exemplary arrangement. For example, in other embodiments, each port 90 may alternatively be aligned with or downstream of the blade trailing edges 82 along the core flowpath 30.

Referring to FIG. 1, the electric machine 14 includes an electric machine rotor 94, an electric machine stator 96 and an electric machine housing 98. The machine rotor 94 is rotatable about a rotational axis 100 of the machine rotor 94. This rotational axis 100 may be an axial centerline of the electric machine 14, and the rotational axis 100 may be parallel (e.g., coaxial) with or offset from the axial centerline 24. The machine stator 96 of FIG. 1 is radially outboard of and circumscribes the machine rotor 94. With this arrangement, the electric machine 14 is configured as a radial flux electric machine. The electric machine 14 of the present disclosure, however, is not limited to such an exemplary rotor-stator configuration nor to radial flux arrangements. The machine rotor 94, for example, may alternatively be radially outboard of and circumscribe the machine stator 96. In another example, the machine rotor 94 may be axially next to the machine stator 96 configuring the electric machine 14 as an axial flux electric machine. Referring again to FIG. 1, the machine rotor 94 and the machine stator 96 are at least partially or completely housed within the machine housing 98.

The machine rotor 94 is coupled to and rotatable with the rotating assembly 50 through a drivetrain 102. This drivetrain 102 may be a direct drive drivetrain where, for example, the machine rotor 94 is coupled to the rotating assembly 50 through a driveshaft. With this arrangement, the machine rotor 94 and the rotating assembly 50 may rotate at a common (the same) rotational velocity. Alternatively, the drivetrain 102 may be an indirect drive drivetrain where, for example, an intermediate torque transmission device 104 (or system) couples the machine rotor 94 to the rotating assembly 50. Examples of the torque transmission device 104 include, but are not limited to, a geartrain (e.g., an epicyclic gear system) and a fluid transmission. With this arrangement, the machine rotor 94 and the rotating assembly 50 may rotate at different rotational velocities.

The electric machine 14 of FIG. 1 may be configurable as an electric generator and/or an electric motor. For example, during a generator mode of operation, the electric machine 14 may operate as the electric generator to convert mechanical power received from the turbine engine 12 into electricity. The rotating assembly 50 and its turbine rotor 46, for example, may drive rotation of the machine rotor 94 through the drivetrain 102. The rotation of the machine rotor 94 may generate an electromagnetic field with the machine stator 96, and the machine stator 96 may convert energy from the electromagnetic field into the electricity. The electric machine 14 may then provide this electricity to the power source 18 for storage or further use. During a motor mode of operation, the electric machine 14 may operate as the electric motor to convert electricity received from the power source 18 into mechanical power. The machine stator 96, for example, may generate an electromagnetic field with the machine rotor 94 using the electricity. This electromagnetic field may drive rotation of the machine rotor 94. The machine rotor 94 may thereby drive rotation of the rotating assembly 50 through the drivetrain 102. This mechanical power may be provided to initially power the turbine engine 12 during startup. Of course, in other embodiments, the electric machine 14 may alternatively be configured as a dedicated electric generator (e.g., without the electric motor functionality).

The electric machine 14 of FIG. 1 also includes one or more internal passages 106A-C (generally referred to as "106"). Each of these internal passages 106 is provided to facilitate cooling of the electric machine 14 and one or more of its members 94 and/or 96. The internal passages 106, for example, may extend along and/or through one or more of the electric machine members 94 and/or 96. The passage 106A (or array of passages about the rotational axis 100), for example, extends (e.g., axially) through a gap (e.g., a radial, clearance gap) between the machine rotor 94 and the machine stator 96. The passage 106B (or array of passages about the rotational axis 100) extend (e.g., axially) through the machine stator 96. The passage 106C (of array of passages about the rotational axis 100) extend about the machine stator 96; e.g., in a plenum surrounding the machine stator 96 within the machine housing 98. These internal passages 106 may collectively form a fluid flowpath 108 (e.g., a cooling flowpath) through the electric machine 14.

The fluid circuit 16 is configured to fluidly couple the turbine engine 12 to the electric machine 14. The fluid circuit 16 of FIG. 1, for example, is configured to fluidly couple the core flowpath 30 to the fluid flowpath 108 and its internal passages 106. This fluid circuit 16 includes the ports 90, the fluid flowpath 108 and its internal passages 106, a manifold 110 and a conduit 112; e.g., a pipe, a duct, etc. The manifold 110 extends circumferentially about the shroud 64, and fluidly couples the ports 90 to the conduit 112; see also FIGS. 2 and 4. The conduit 112 of FIG. 1 is disposed outside of the turbine engine 12 and the electric machine 14. The conduit 112 is between and fluidly couples the ports 90 (e.g., via the manifold 110) to the fluid flowpath 108 and its internal passages 106. With this arrangement, the fluid circuit 16 may facilitate a fluid transfer between the turbine engine 12 and the electric machine 14 as described below in further detail.

The power source 18 is electrically coupled with the electric machine 14 through electrical circuitry; e.g., a power bus. This electrical circuitry may include one or more electrical leads 114 (e.g., high voltage lines) and one or more electrical devices 116 for conditioning, metering, regulating and/or otherwise controlling electrical power transfer between the electric machine 14 and the power source 18. Examples of the electrical devices 116 include, but are not limited to, switches, current regulators, converters and buffers.

The power source 18 is configured to store electricity. The power source 18 is also configured to provide the stored electricity to the electric machine 14 and/or receive electricity from the electric machine 14; e.g., during recharging. The power source 18, for example, may be configured as or otherwise include one or more electricity storage devices 118; e.g., batteries, etc.

Figure 5:
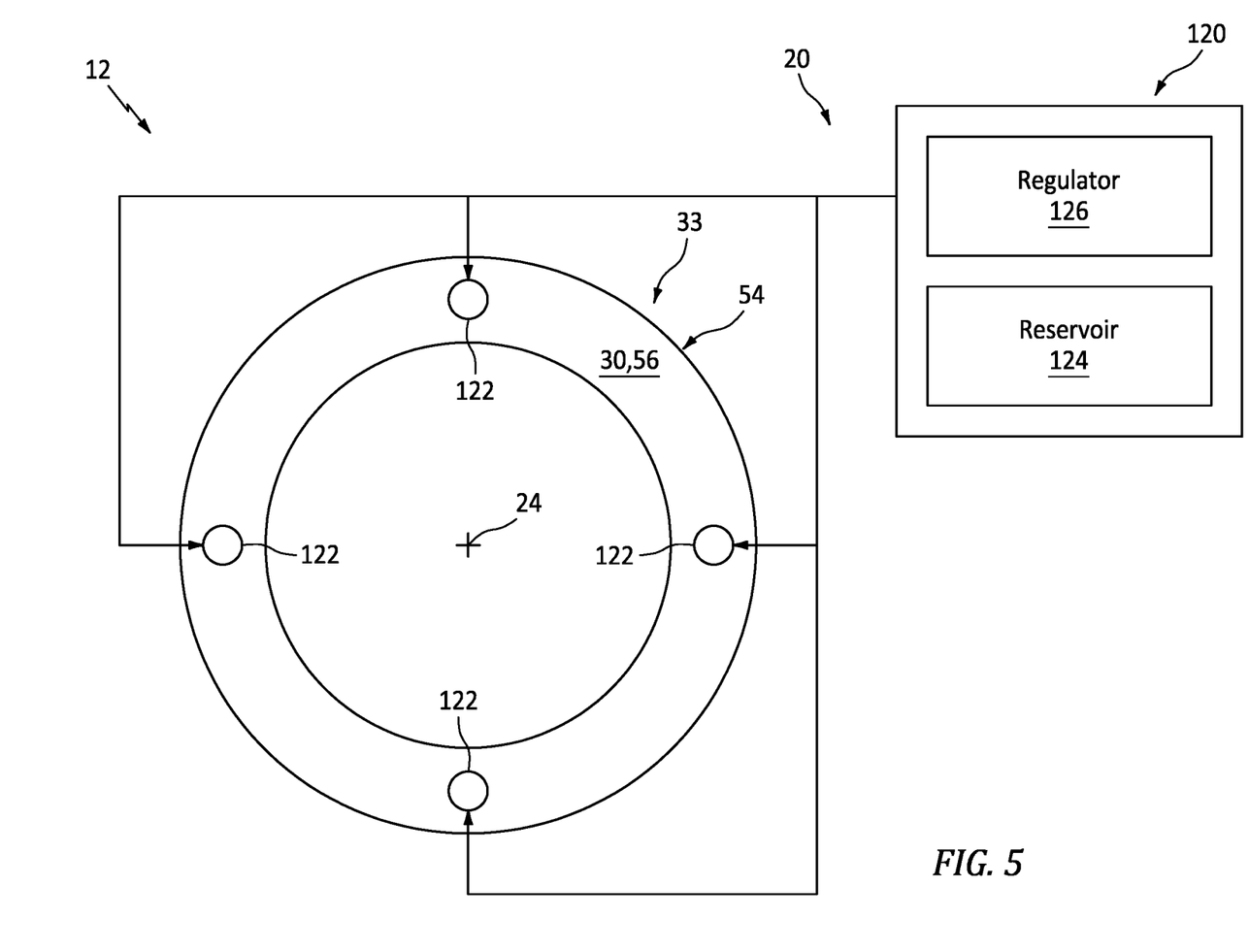
FIG. 5 is a schematic illustration of a fuel system for a combustor section.

Referring to FIG. 5, the fuel system 20 is configured to deliver the fuel to the turbine engine 12. The fuel system 20 of FIG. 5 includes a fuel source 120 and one or more fuel injectors 122. The fuel source 120 includes a fuel reservoir 124 and/or a fuel flow regulator 126; e.g., a valve and/or a pump. The fuel reservoir 124 is configured to store the fuel before, during and/or after turbine engine operation. The fuel reservoir 124, for example, may be configured as or otherwise include a tank, a cylinder, a pressure vessel, a bladder or any other type of fuel storage container. The fuel flow regulator 126 is configured to direct and/or meter a flow of the fuel from the fuel reservoir 124 to the fuel injectors 122. The fuel injectors 122 may be arranged circumferentially about the axial centerline 24 in an array. Each fuel injector 122 is configured to direct the fuel received from the fuel source 120 into the combustion chamber 56 for mixing with the compressed core air to provide the fuel-air mixture.

Referring to FIG. 1, the controller 22 is in signal communication with (e.g., hardwired and/or wirelessly coupled to) one or more members of the powerplant 10; e.g., elements 14, 20 and 116. The controller 22 may be implemented with a combination of hardware and software. The hardware may include at least one processing device 128 and memory 130. The processing device 128 may include one or more single-core and/or multi-core processors. The hardware may also or alternatively include analog and/or digital circuitry other than that described above. The memory 130 is configured to store software (e.g., program instructions) for execution by the processing device 128, which software execution may control and/or facilitate performance of one or more operations such as those described herein. The memory 130 may be a non-transitory computer readable medium. For example, the memory 130 may be configured as or include a volatile memory and/or a nonvolatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

Figure 6:
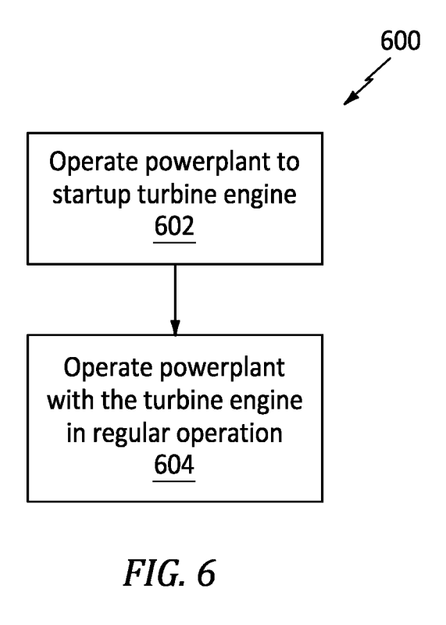
FIG. 6 is a flow diagram of a method of operation for an aircraft powerplant.

FIG. 6 is a flow diagram of a method 600 of operation for a powerplant. For ease of description, the operating method 600 is described below with respect to the powerplant 10 described above. The operating method 600 of the present disclosure, however, is not limited to such an exemplary powerplant.

In step 602, the powerplant 10 is operated to startup the turbine engine 12. During this engine startup operation, the controller 22 may signal the electrical devices 116 to direct electricity from the power source 18 to the electric machine 14 to facilitate electric motor operation. The electricity powers rotation of the machine rotor 94 as discussed above, and the machine rotor 94 may drive rotation of the rotating assembly 50 through the drivetrain 102. Concurrently or subsequently, the controller 22 may signal the fuel system 20 to deliver fuel to the turbine engine 12 and its fuel injectors 122. The fuel injectors 122 may inject the fuel into the combustion chamber 56 for mixing with air compressed by the electric machine driven rotating assembly 50 and its compressor rotor 44. This fuel-air mixture may be ignited and combustion products thereof may flow out of the combustor section 33, through the turbine section 34 and the exhaust section 35, and out of the turbine engine 12 through the core exhaust 42. As the rotating assembly 50 spools up and as combustion of the fuel-air mixture within the combustion chamber 56 becomes self-sustaining, the flow of electricity to the electric machine 14 may be decreased and/or stopped. The turbine engine 12 may then be powered up (e.g., fed more fuel by the fuel system 20) for regular turbine engine operation.

During the engine startup operation, air may be vented out of the core flowpath 30 through the ports 90 in the shroud 64. Such venting may reduce or prevent occurrence of surge and/or various other undesirable modes within the turbine engine 12 and, for example, its compressor section 32. The air vented from the compressor section 32 through the ports 90 is directed through the fluid circuit 16 to the electric machine 14. This air may then flow through the fluid flowpath 108 and its internal passages 106 before being exhausted from the electric machine 14, for example, via an orifice 132 (or orifices); here, a fluid circuit exhaust. As the air flows through the internal passages 106, the air may cool one or more members 94 and/or 96 of the electric machine 14. The fluid circuit 16 may thereby facilitate cooling of the electric machine 14 during the engine startup operation.

In step 604, the powerplant 10 is operated to facilitate regular operation of the turbine engine 12, for example, as described above. During this regular engine operation, air may now be drawn (e.g., suctioned via vacuum) into the core flowpath 30 through the ports 90. The compressor section 32 may thereby draw air into the fluid circuit 16 through the orifice 132 (or orifices); here, a fluid circuit inlet. This air flows through the fluid flowpath 108 and its internal passages 106, where the air may further cool one or more members 94 and/or 96 of the electric machine 14. The fluid circuit 16 may thereby facilitate cooling of the electric machine 14 during the regular engine operation. The air may then flow through the conduit 112, the manifold 110 and the ports 90 into the core flowpath 30, where that air may be compressed by the compressor rotor 44 and directed into the combustor section 33, with the air received through the core inlet 40, as the core air. It is contemplated the air drawn into the core flowpath 30 through the fluid circuit 16 and its ports 90 may account for about one percent (1%) to two percent (2%) of the core air delivered to the combustor section 33 during the regular engine operation. The present disclosure, however, is not limited to such an exemplary relationship.

While the air is drawing into the core flowpath 30 through the ports 90, some of the compressed core air may also be bled from the core flowpath 30. This bleed air may be provided to one or more other devices outside of the turbine engine 12 and/or the powerplant 10; e.g., a propulsion engine starter motor, an actuator, an aircraft environmental control system, etc. The compressed core air, for example, may be bled from the diffuser plenum 60 and directed through at least one valve 134 to the one or more other devices. The valve 134, however, may be closed during the engine startup operation described above.

During the regular engine operation, the turbine engine 12 may power operation of the electric machine 14 as the electric generator. The rotating assembly 50, for example, may drive rotation of the machine rotor 94 through the drivetrain 102. This rotation of the machine rotor 94 may facilitate generation of electricity as described above, and the electricity may be provided to the power source 18 for storage or distribution to other aircraft electronics.

The compressor rotor 44 is described above as a radial flow compressor rotor. It is contemplated, however, the shroud 64 and its port(s) 90 may alternatively be arranged along an axial flow compressor rotor in other embodiments.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A powerplant, comprising:
    an electric machine;
    a turbine engine operatively coupled to the electric machine, the turbine engine including a core flowpath, a compressor section, a combustor section and a turbine section, the core flowpath extending through the compressor section, the combustor section and the turbine section from an inlet into the flowpath to an exhaust from the flowpath, and the compressor section comprising a shroud, the shroud having a thickness and forming an outer flowpath wall along the core flowpath within the compressor section, the shroud including ports arranged circumferentially about an axial centerline in an array, the ports including a first port and a second port, each of the ports extending through the thickness of the shroud to the core flowpath, and each of the ports fluidly coupled with the core flowpath within the compressor section;
    a fluid circuit including:
        an internal passage extending through the electric machine;
        an orifice fluidly coupling an outside of the electric machine to the electric machine;
        the ports; and
        a conduit fluidly coupling the internal passage to the ports, the fluid circuit fluidly coupling the core flowpath to a fluid passage, the fluid passage including the internal passage;
    the compressor section is configured to draw air through the fluid circuit via the orifice and into the core flowpath during regular operation of the turbine engine, the orifice being a fluid circuit inlet during the regular operation of the turbine engine; and
    the compressor section is configured to direct air out of the core flowpath and into the fluid circuit before being exhausted from the electric machine during startup operation of the turbine engine, the orifice being a fluid circuit exhaust during the startup operation of the turbine engine.

2. The powerplant of claim 1, wherein
    the electric machine comprises an electric machine stator; and
    the internal passage extends through the electric machine stator.

3. The powerplant of claim 1, wherein
    the electric machine comprises an electric machine rotor; and
    the internal passage extends through the electric machine rotor.

4. The powerplant of claim 1, wherein
    the compressor section further comprises a compressor rotor housed within the shroud;
    the compressor rotor includes a plurality of compressor blades arranged circumferentially about an axis and disposed within the core flowpath, each of the plurality of compressor blades including respective blade tips; and
    the shroud is disposed radially and/or axially adjacent the blade tips of the plurality of compressor blades, and circumscribes the plurality of compressor blades and the respective blade tips.

5. The powerplant of claim 4, wherein the ports are located longitudinally along the flowpath at the compressor rotor.

6. The powerplant of claim 4, wherein
    the plurality of compressor blades include a first compressor blade; and
    the ports are located longitudinally along the core flowpath downstream of a leading edge of the first compressor blade.

7. The powerplant of claim 4, wherein
    the plurality of compressor blades include a first compressor blade; and
    the ports are located longitudinally along the core flowpath upstream of a trailing edge of the first compressor blade.

8. The powerplant of claim 4, wherein
    the plurality of compressor blades include a first compressor blade; and
    the ports are located longitudinally along the core flowpath between a leading edge of the first compressor blade and a trailing edge of the first compressor blade.

9. The powerplant of claim 4, wherein the compressor rotor is configured as a radial flow compressor rotor.

10. The powerplant of claim 1, wherein
    the fluid circuit further includes a manifold; and
    the manifold fluidly couples the first port and the second port to the conduit.

11. The powerplant of claim 1, wherein the electric machine is configurable as an electric generator.

12. The powerplant of claim 1, wherein the electric machine is configurable as an electric motor.

13. The powerplant of claim 1, further comprising a drivetrain rotatably coupling a rotating assembly of the turbine engine to a rotor of the electric machine.

14. The powerplant of claim 13, wherein the drivetrain comprises a geartrain coupled between the rotating assembly of the turbine engine and the rotor of the electric machine.

15. A powerplant, comprising:
an electric machine comprising an internal passage therethrough and an orifice coupling an outside of the electric machine to the electric machine; and
a turbine engine operatively coupled to the electric machine, the turbine engine including a core flowpath, a compressor section, a combustor section and a turbine section;
the core flowpath extending through the compressor section, the combustor section and the turbine section from an inlet into the core flowpath to an exhaust from the core flowpath; and
the turbine engine configured to draw air through the internal passage via the orifice and into the core flowpath during regular operation of the turbine engine, the orifice being a fluid circuit inlet during the regular operation of the turbine engine; and
the turbine engine configured to direct air out of the core flowpath and into the internal passage before being exhausted from the electric machine during startup operation of the turbine engine, the orifice being a fluid circuit exhaust during the startup operation of the turbine engine;
wherein the compressor section comprises a shroud, the shroud forming an outer flowpath wall along the core flowpath, the shroud including ports arranged circumferentially about an axial centerline in an array, the ports including a first port and a second port, each of the ports extending through a thickness of the shroud to the core flowpath, and each of the ports fluidly coupled with the core flowpath within the compressor section.

16. A method of operation, comprising:
driving rotation of a rotor within an electric machine using a turbine engine to generate electricity; and
drawing air through a fluid circuit for the electric machine into a flowpath of the turbine engine to cool the electric machine,
the fluid circuit comprising:
an internal passage extending through the electric machine;
an orifice fluidly coupling an outside of the electric machine to the electric machine;
a first port and a second port extending through a shroud to the flowpath; and
a conduit fluidly coupling the internal passage to the first port and the second port, the fluid circuit fluidly coupling the flowpath to a fluid passage, the fluid passage including the internal passage; and
the drawing air through the fluid circuit for the electric machine into the flowpath of the turbine engine to cool the electric machine comprising:
drawing air through the fluid circuit via the orifice and into the core flowpath during regular operation of the turbine engine, the orifice being a fluid circuit inlet during the regular operation of the turbine engine; and
directing air out the core flowpath and into the fluid circuit before being exhausted from the electric machine during startup operation of the turbine engine, the orifice being a fluid circuit exhaust during the startup operation of the turbine engine.

17. The method of claim 16, wherein the shroud houses a compressor rotor of the turbine engine.

18. The method of claim 16, wherein
the turbine engine includes a compressor section, a combustor section and a turbine section; and
the flowpath extends through the compressor section, the combustor section and the turbine section from an inlet into the flowpath to an exhaust from the flowpath.

* * * * *